United States Patent
Sivakumar et al.

(10) Patent No.: US 11,238,217 B2
(45) Date of Patent: Feb. 1, 2022

(54) TASK BASED SELF EXPLORATION OF COGNITIVE SYSTEMS

(71) Applicant: International Business Machines Corporation, Armonk, NY (US)

(72) Inventors: Gandhi Sivakumar, Bentleigh (AU); Lynn Kwok, Bundoora (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 32 days.

(21) Appl. No.: 16/871,142

(22) Filed: May 11, 2020

(65) Prior Publication Data
US 2021/0350072 A1 Nov. 11, 2021

(51) Int. Cl.
*G06F 17/00* (2019.01)
*G06F 40/20* (2020.01)

(52) U.S. Cl.
CPC .................... *G06F 40/20* (2020.01)

(58) Field of Classification Search
CPC ................ G06F 40/20; G06N 20/00
See application file for complete search history.

(56) References Cited

U.S. PATENT DOCUMENTS

| | | |
|---|---|---|
| 7,751,955 B2 | 7/2010 | Chinnadurai et al. |
| 7,920,678 B2 | 4/2011 | Cooper et al. |
| 9,085,303 B2 | 7/2015 | Wolverton et al. |
| 9,286,910 B1 | 3/2016 | Li et al. |
| 9,336,302 B1* | 5/2016 | Swamy ................. G06F 16/355 |
| 9,552,350 B2 | 1/2017 | Brown et al. |
| 9,678,949 B2* | 6/2017 | Monk, II ................. G06F 40/30 |
| 10,049,663 B2* | 8/2018 | Orr ..................... G10L 15/1815 |
| 10,991,369 B1* | 4/2021 | Borisov ............. G06F 16/3329 |
| 2014/0279050 A1* | 9/2014 | Makar ................. G06F 16/9535 705/14.66 |
| 2015/0235240 A1* | 8/2015 | Chang ................. G06Q 30/0202 705/7.31 |
| 2018/0025303 A1* | 1/2018 | Janz ...................... G16H 10/20 705/2 |

(Continued)

OTHER PUBLICATIONS

Disclosed Anonymously, "Disambiguation of entity references using related entities"; An IP.com Prior Art Database Technical Disclosure; IP.com No. IPCOM000253439D; Electronic Publication Date: Mar. 29, 2018, 7 pages.

(Continued)

*Primary Examiner* — Laurie A Ries
(74) *Attorney, Agent, or Firm* — John Noh; Edell, Shapiro & Finnan, LLC

(57) ABSTRACT

A method, a computer system, and a computer program product are provided. A computing system receives natural language first textual input from a second computing system and performs natural language processing. The natural language processing identifies vagueness and missing information in the first textual input. Additional information is obtained from at least one source responsive to identifying at least one of the vagueness and the missing information. The identified vagueness and the missing information are resolved based on the obtained additional information and a meaning of the first textual input is determined. Output is provided to the second computing system for presentation to a user.

14 Claims, 10 Drawing Sheets

(56) References Cited

U.S. PATENT DOCUMENTS

| | | | |
|---|---|---|---|
| 2018/0068657 A1 | 3/2018 | Khan et al. | |
| 2018/0143803 A1* | 5/2018 | La Placa | |
| 2018/0232563 A1* | 8/2018 | Albadawi | G06K 9/00255 |
| 2018/0314689 A1* | 11/2018 | Wang | G10L 15/07 |
| 2019/0114549 A1* | 4/2019 | Olsher | G06Q 10/025 |
| 2019/0332680 A1* | 10/2019 | Wang | G06F 40/30 |
| 2020/0104653 A1* | 4/2020 | Solomon | G06F 3/04842 |
| 2021/0201238 A1* | 7/2021 | Sekar | G06Q 30/016 |
| 2021/0314282 A1* | 10/2021 | Sharma | G06N 20/00 |

OTHER PUBLICATIONS

Payjo.com, "Intelligent Virtual Assistant Platform Interface"; published by Interface 2020; https://interface.ai.platform/, 5 pages.
"Meet Erica, Your Financial Digital Assistant From Bank of America"; Bank of America 2020; https://promo.bankofamerica.com/erica/, downloaded from the internet on May 9, 2020, 4 pages.

* cited by examiner

TASK BASED SELF EXPLORATION OF COGNITIVE SYSTEMS

BACKGROUND

1. Technical Field

Present invention embodiments relate to a computer-implemented method, a computing system, and a computer program product for filling gaps in information provided to an application, and more specifically, to a computer-implemented method, a computing system, and a computer program product that identifies vague or ambiguous natural language input, obtains information from one or more sources to fill in gaps, and clarifies ambiguities in the natural language input for a virtual assistant system.

2. Discussion of the Related Art

Machines are becoming more intelligent not only to better serve humans by using cognitive interfaces, which communicate with humans using natural language, but also through cognitive devices such as, for example, robots and other cognitive devices. Cognitive interfaces use artificial intelligence and have an ability to obtain additional information and communicate with other devices.

Artificial intelligence systems can be used to solve a variety of problems. For example, virtual assistants can be deployed to assist humans in a business or social ecosystem. For example, virtual assistants (VAs) are deployed to assist end users with tasks that include, but are not limited to, installation and troubleshooting of information technology (IT) systems, and banking services provided by an interactive banking system that receives customer calls and provides services such as, for example, fund transfers, balance inquiry responses, as well as other banking services.

One common problem that can occur in any end user customer communication system is language ambiguity. For example, when a user communicates in ambiguous phrases with a VA to resolve technical issues, the VA does not receive sufficient information to help resolve the technical issues. Consequently, the VA may ask the end user a number of questions, thereby making a bad impression on the end user by providing a negative user experience.

SUMMARY

According to one embodiment of the present invention, a computer-implemented method is provided for filling gaps in information provided to a first computing system. According to the computer-implemented method, a first computing system receives first textual input in natural language from a second computing system and performs natural language processing of the received first textual input to identify vagueness and missing information in the first textual input. The first computing system obtains additional information from at least one source responsive to identifying at least one of the vagueness and the missing information. The identified vagueness and the missing information are resolved based on the obtained additional information and a meaning of the first textual input is determined. The first computing system provides, to the second computing system, output based on the determined meaning for presentation to a user.

According to a second embodiment of the present invention, a computing system is provided for filling gaps in provided input. The computing system includes at least one processor connected to a network, and at least one memory connected to the at least one processor. The at least one processor is configured to receive first textual input in natural language from a second computing system, and perform natural language processing of the received first textual input to identify vagueness and missing information in the first textual input. The at least one processor is further configured to obtain additional information from at least one source responsive to identifying at least one of the vagueness and the missing information. The identified vagueness and the missing information are resolved based on the obtained additional information and determining a meaning of the first textual input. Information is provided to the second computing system, based on the determined meaning, for presentation to a user.

According to a third embodiment of the present invention, a computer program product for filling gaps in provided information includes one or more computer readable storage media having program instructions collectively stored on the one or more computer readable storage media. The program instructions are executed by a computer to cause the computer to perform a number of steps. The steps include receiving first textual input in natural language from a second computing system, and performing natural language processing of the received first textual input to identify vagueness and missing information in the first textual input. Additional data is obtained from at least one source responsive to identifying at least one of the vagueness and the missing information. The identified vagueness and the missing information are resolved based on the obtained additional information and a meaning of the first textual input is determined. Output is provided to the second computing system, based on the determined meaning, for presentation to a user.

BRIEF DESCRIPTION OF THE DRAWINGS

Generally, like reference numerals in the various figures are utilized to designate like components.

DETAILED DESCRIPTION

In various embodiments, a computer-implemented method, a computing system, and a computer program product are provided that receive natural language textual input from a client computing device such as, for example, a user's computing device. In some embodiments, the user may provide natural language speech input via the user's computing device, which may convert the natural language speech input to natural language text that is provided to a server computing device such as, for example, a support center system, which may include a computing platform of one or more computing devices located in a cloud computing environment. In some embodiments, communications between the user's computing device and the support center system may be implemented via application program interfaces (APIs).

A machine learning model included in the support center system may be trained to identify natural language textual input that is either ambiguous or missing information. If such natural language input is identified, the support center system may determine a nature of the ambiguity or the missing information and may request additional information from one or more sources. In some embodiments, the one or more sources may include the user's computing device, which further may include an image capturing component for capturing images and an audio capturing component for capturing audio. The user's computing device also may include a video capturing component for capturing both video and audio.

The support center system may determine gap filling information for clarifying a detected ambiguity and/or providing information missing from the natural language textual input to produce non-ambiguous natural language textual input without missing information. The non-ambiguous natural language textual input then may be provided to an application such as, for example, a virtual assistant system, which may provide to the user's computing device a response to the natural language input for presentation to the user without asking the user a series of questions to clarify ambiguities and missing information of the natural language textual input.

Figure 1:
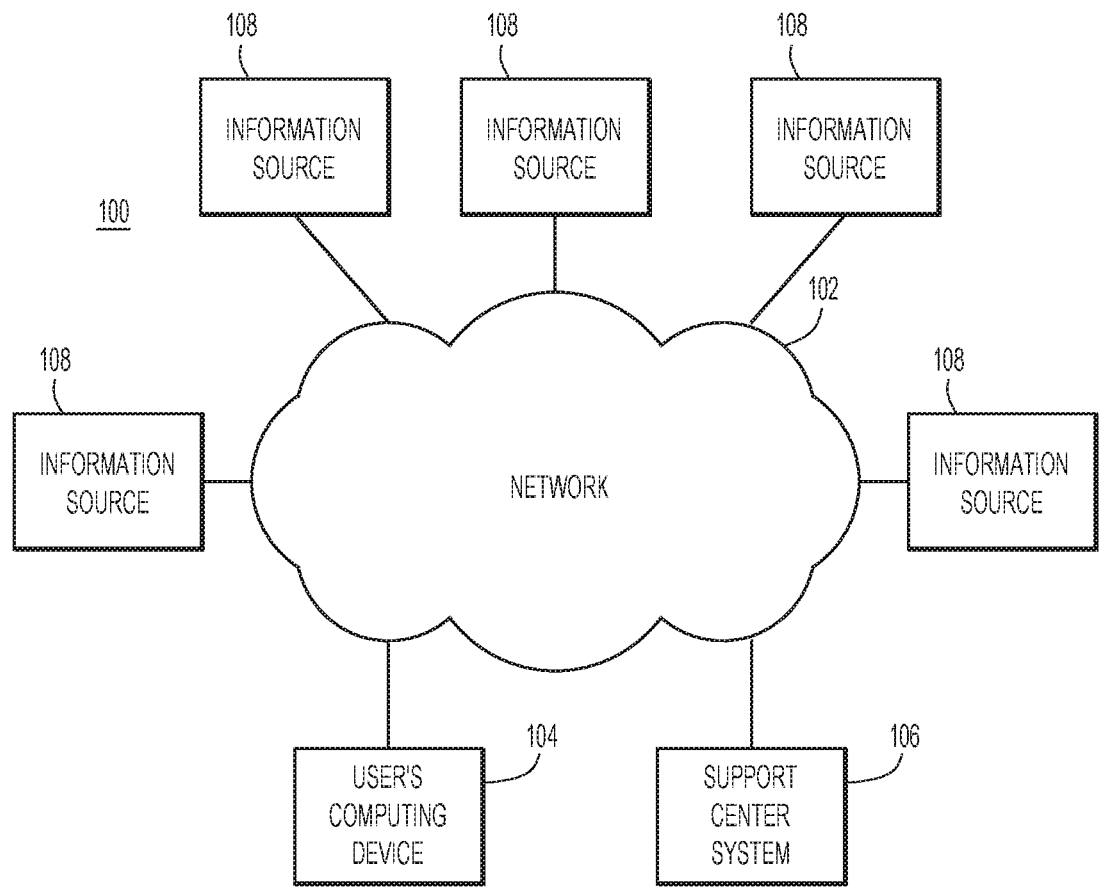
FIG. 1 is a diagrammatic illustration of an example computing environment according to an embodiment of the present invention.

An example environment for use with present invention embodiments is illustrated in FIG. 1. Specifically, the environment includes one or more server systems such as, for example, support center system 106, and one or more client or end user systems such as, for example, user's computing device 104. Support center system 106 and user's computing device 104 may be remote from each other and may communicate over a network 102. The network may be implemented by any number of any suitable communications media (e.g., wide area network (WAN), local area network (LAN), Internet, Intranet, etc.). Alternatively, support center system 106 and user's computing device 104 may be local to each other, and may communicate via any appropriate local communication medium (e.g., local area network (LAN), hardwire, wireless link, Intranet, etc.). In one embodiment, user's computing device 104 may include a personal computer, a laptop computer, a tablet computer, a smartphone, or other computing device.

User's computing device 104 may enable a user to provide natural language speech input or natural language textual input. If the user provides natural language speech input, user's computing device 104 may convert the natural language speech input to natural language textual input, which may be provided to support center system 106 via a network 102 by use of APIs.

Support center system 106 may identify ambiguities and missing information in the provided natural language textual input and may obtain additional information from user's computing device 104 and/or one or more other information sources 108 based on which support center system 106 may fill gaps and clarify ambiguities in the provided natural language textual input. The natural language textual input with the clarified ambiguities and the filled in gaps then may be provided to an application such as, for example, a VA, which may be executing on the support center system.

Figure 2:
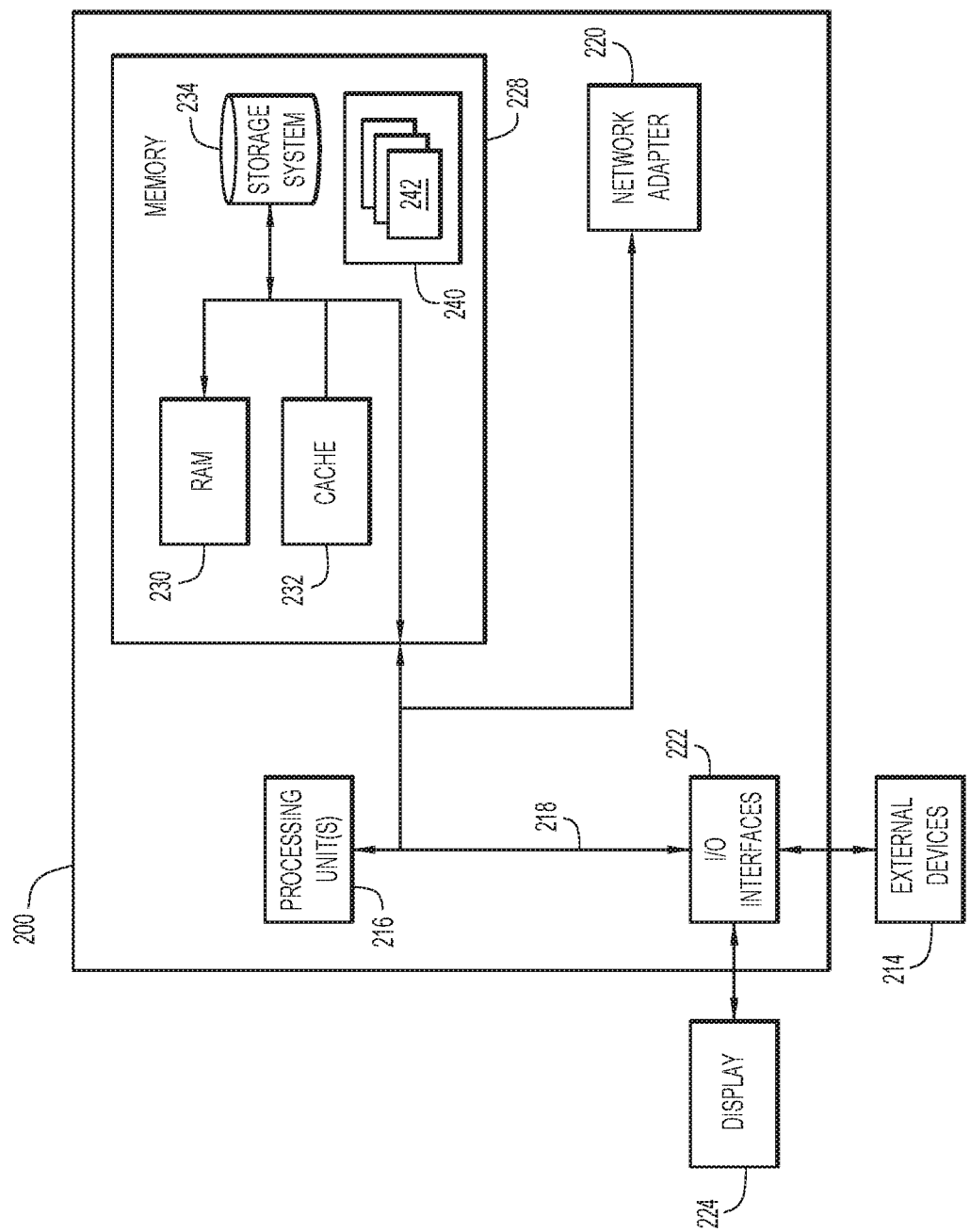
FIG. 2 is a block diagram of an example server computing device according to an embodiment of the present invention.

Referring now to FIG. 2, a schematic of an example computer system 200 is shown, which may implement any of support center system 106 and information sources 108 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
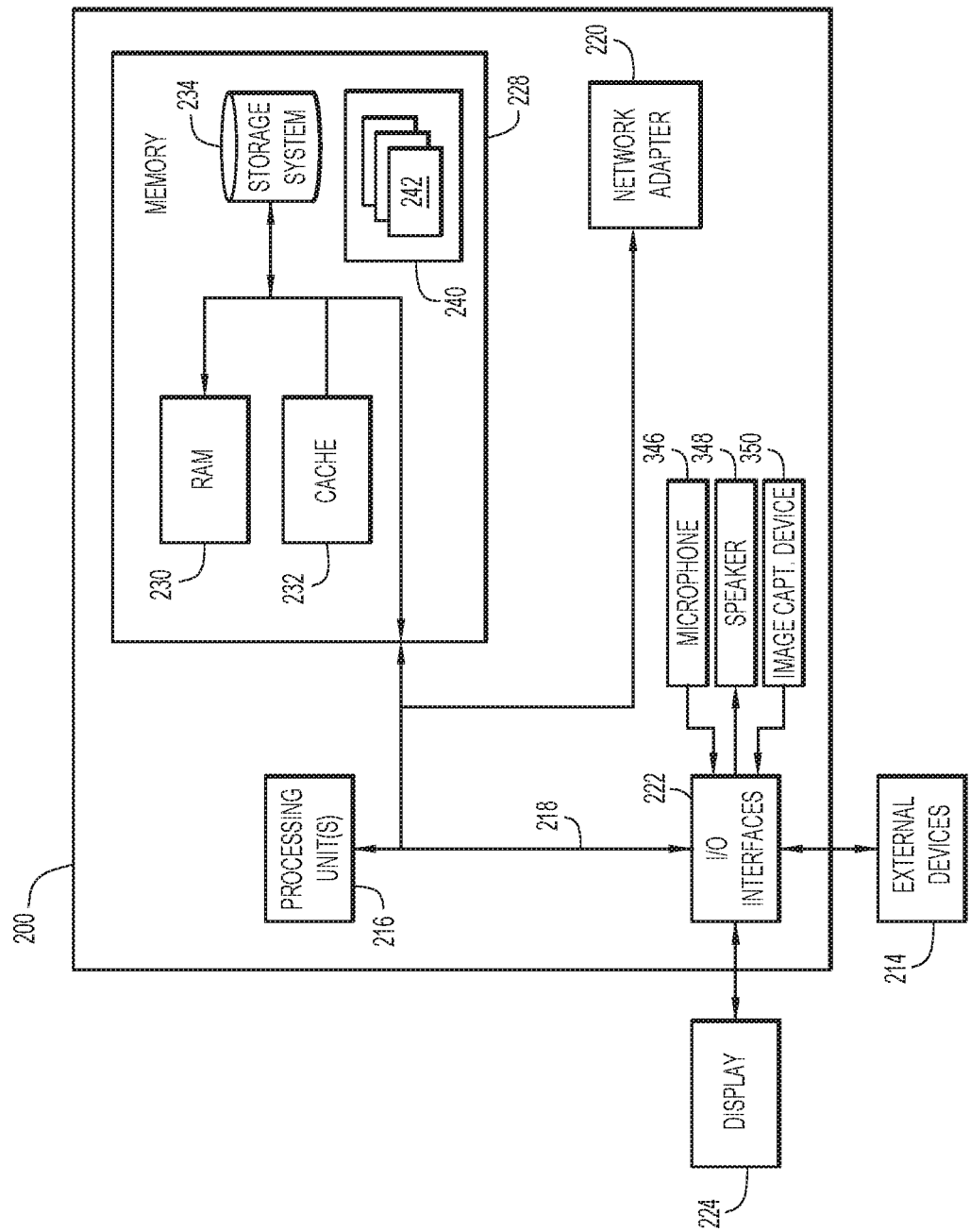
FIG. 3 is a block diagram of an example client computing device for use with the server computing device of FIG. 2 according to an embodiment of the present invention.

FIG. 3 illustrates a schematic of an example computing system 300, which may implement a client device such as, for example, user's computing device 104. Computer system 300 is shown in a form of a general-purpose computing device. Components of computer system 300 may include, but are not limited to, one or more processors or processing units 216, a system memory 328, and a bus 218 that couples various system components including system memory 328 and I/O interfaces 222 to one or more processing units 216, all of which were previously described with respect to FIG. 2. Computing system 300 further may include a microphone 346, one or more speakers 348 and an image capturing device 350, which may be capable of capturing still images as well as video with audio.

Computer system 300 may include a variety of computer system readable media. Such media may be any available media that is accessible by computer system 300, and may include both volatile and non-volatile media, removable and non-removable media.

As previously described with respect to FIG. 2, system memory 328 can include computer system readable media in the form of volatile memory, such as random access memory (RAM) 230 and/or cache memory 232. Computer system 300 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, the one or more application programs, the other program modules, and the program data or some combination thereof, may include an implementation of a networking environment. Program modules 342 generally carry out the functions and/or methodologies of embodiments of the invention as described herein.

Computer system 300 may also communicate with one or more external devices 214 such as a keyboard, a pointing device, one or more displays 224, one or more devices that enable a user to interact with computer system 300, and/or any devices (e.g., network card, modem, etc.) that enable computer system 300 to communicate with one or more other computing devices. Such communication can occur via Input/Output (I/O) interfaces 222. Still yet, computer system 300 can communicate with one or more networks such as a local area network (LAN), a general wide area network (WAN), and/or a public network (e.g., the Internet) via network adapter 220. As depicted, network adapter 220 communicates with the other components of computer system 300 via bus 218. It should be understood that, although not shown, other hardware and/or software components could be used in conjunction with computer system 300. Examples, include, but are not limited to: microcode, device drivers, redundant processing units, external disk drive arrays, RAID systems, tape drives, and data archival storage systems, etc.

Figure 4:
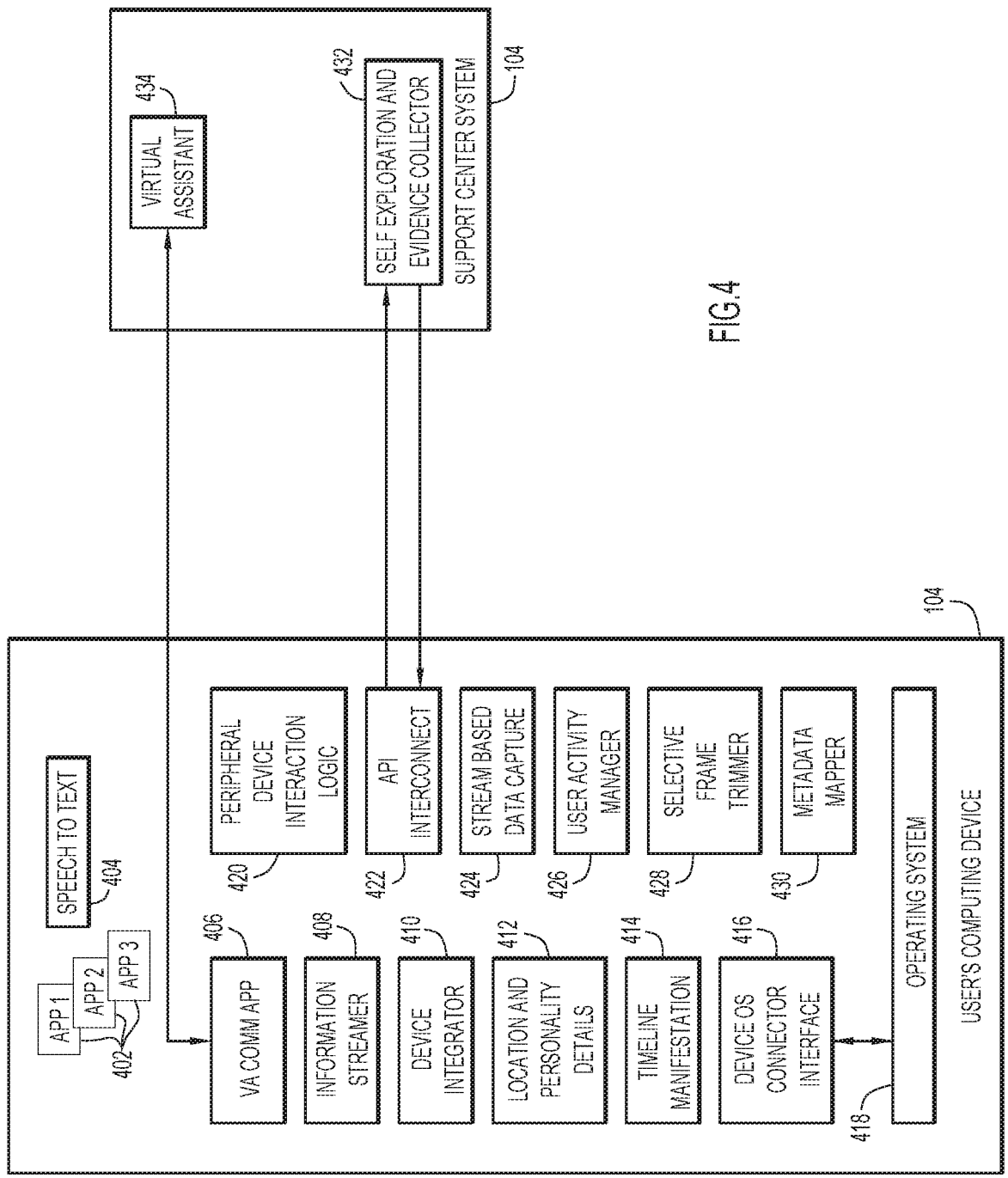
FIG. 4 is a functional block diagram illustrating, in more detail, the server computing device and the client computing device according to an embodiment of the present invention.

FIG. 4 is a functional block diagram showing user's computing device 104 and support center system 106 in more detail. Users computing device 104 may execute one or more applications 402 and a speech-to-text application 404 for converting speech input to text. VA communication application 406 sends communications to VA 434 and receives communications from VA 434. Information streamer 408 may stream information from user's computing device 104 to support center system 106. Device integrator 410 may act as a bridge to respective drivers of various devices of user's computing device 104. Location and personality details 412 may maintain information regarding a current location of user's computing device 104 and personality details of the user such as, for example, easy-going, disagreeable, angry, sarcastic, etc., based on a history of communications of the user. Timeline manifestation 414 may keep track of requests made by user's computing device 104 over time. Device operating system (OS) connector interface 416 may provide an interface to an operating system 418 of user's computing device 104. Peripheral device interaction logic 420 includes logic for interacting with various peripheral devices of user's computing device 104 such as, for example, microphone 346, one or more speakers 348, image capturing device 350, etc. API interconnect 422 may send communications to and receive communications from self exploration and evidence collector 432 executing in support center system 106. Stream based data capture 424 may capture streamed data to be sent to support center system 106 such as, for example, captured video data, etc. User activity manager 426 keeps track of a current activity of the user such as, for example, using a particular application, driving, resting, etc. Selective frame trimmer 428 may split natural language input into sections for analysis. Metadata mapper 430 may map any of the above-mentioned information to metadata, which may be provided to self exploration and evidence collector 432.

Support center system 106 may include self exploration and evidence collector 432, which will be discussed in more detail below, and virtual assistant 434.

Figure 5:
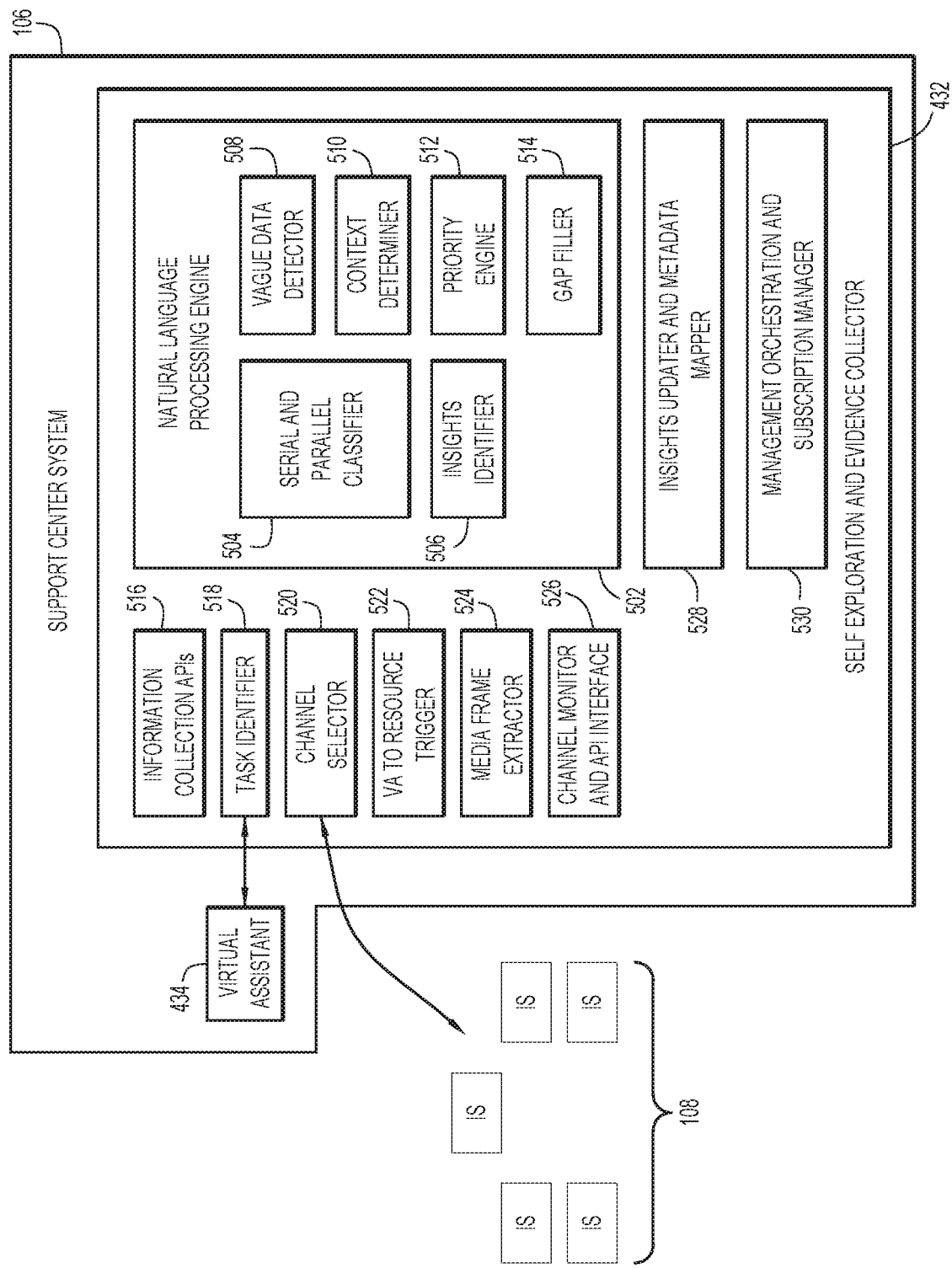
FIG. 5 is a functional block diagram illustrating, in detail, a self exploration and evidence collector included in the server computing device according to an embodiment of the present invention.

FIG. 5 shows support center system 106 in more detail. Support center system 106 may include VA 434 and self exploration and evidence collector 432. Self exploration and evidence collector 432 may include natural language processing engine 502, which may further include serial and parallel classifier 504, insights identifier 506, vague data detector 508, context determiner 510, priority engine 512, and gap filler 514.

Serial and parallel classifier 504 may use known techniques to parse natural language text to identify object components within the natural language text and relationships between the object components. Vague data detector 508 may identify which object components are ambiguous without context. Further, vague data detector 508 may identify whether information is missing from the natural language text. For example, if the natural language textual input is "Today's weather is nice.", without any previous recent reference to the weather, vague data detector 108 may identify today's weather as missing information. Context determiner 510 may determine a context regarding the natural language textual input based, at least partly, on information provided from user's computing device 104. Gap filler 514 may resolve ambiguities in the natural language textual input and may provide information that is missing from the natural language textual input. Insights identifier 506 may derive inferences based on information collected from user's computing device 104 and information sources 108.

Self exploration and evidence collector 432 also may include information collection APIs 516, task identifier 518, channel selector 520, VA to resource trigger 522, media frame extractor 524, channel monitor and API interface 526, insights updater and metadata mapper 528, and management orchestration and subscription manager 530.

Information collection APIs 516 may communicate with user's computing device 104 to collect information therefrom. Task identifier 518 may communicate with and identify a task for an application such as, for example, VA 434. Channel selector 520 may select one or more information sources 108 from which to collect information. VA to resource trigger 522 may request information from a resource at user's computing device 104 such as, for example, image capturing device, etc. Media frame extractor 524 may analyze and extract collected information from information sources 108. Channel monitor and API interface 526 may monitor information received from information sources 108 and may interface with information collection APIs 516. Insights updater and metadata mapper 528 may update any insights and may map at least some collected data to metadata.

VA 434 may be a virtual assistant implemented on support center system 106. VA 434 may be a conventional virtual assistant in some embodiments. In other embodiments, VA 434 may be replaced with another application that expects to receive natural language textual input.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
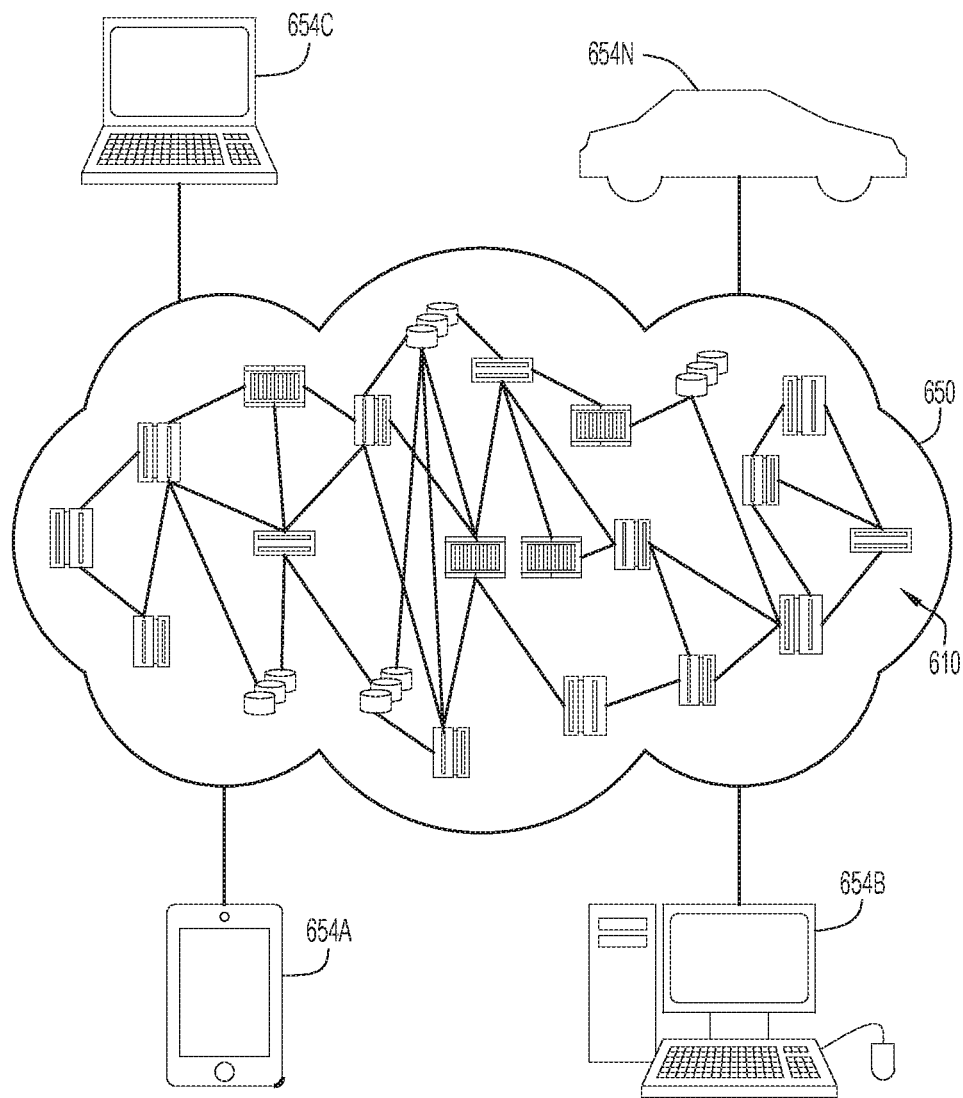
FIG. 6 illustrates an example cloud computing environment in which a server computing system may be implemented according to an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
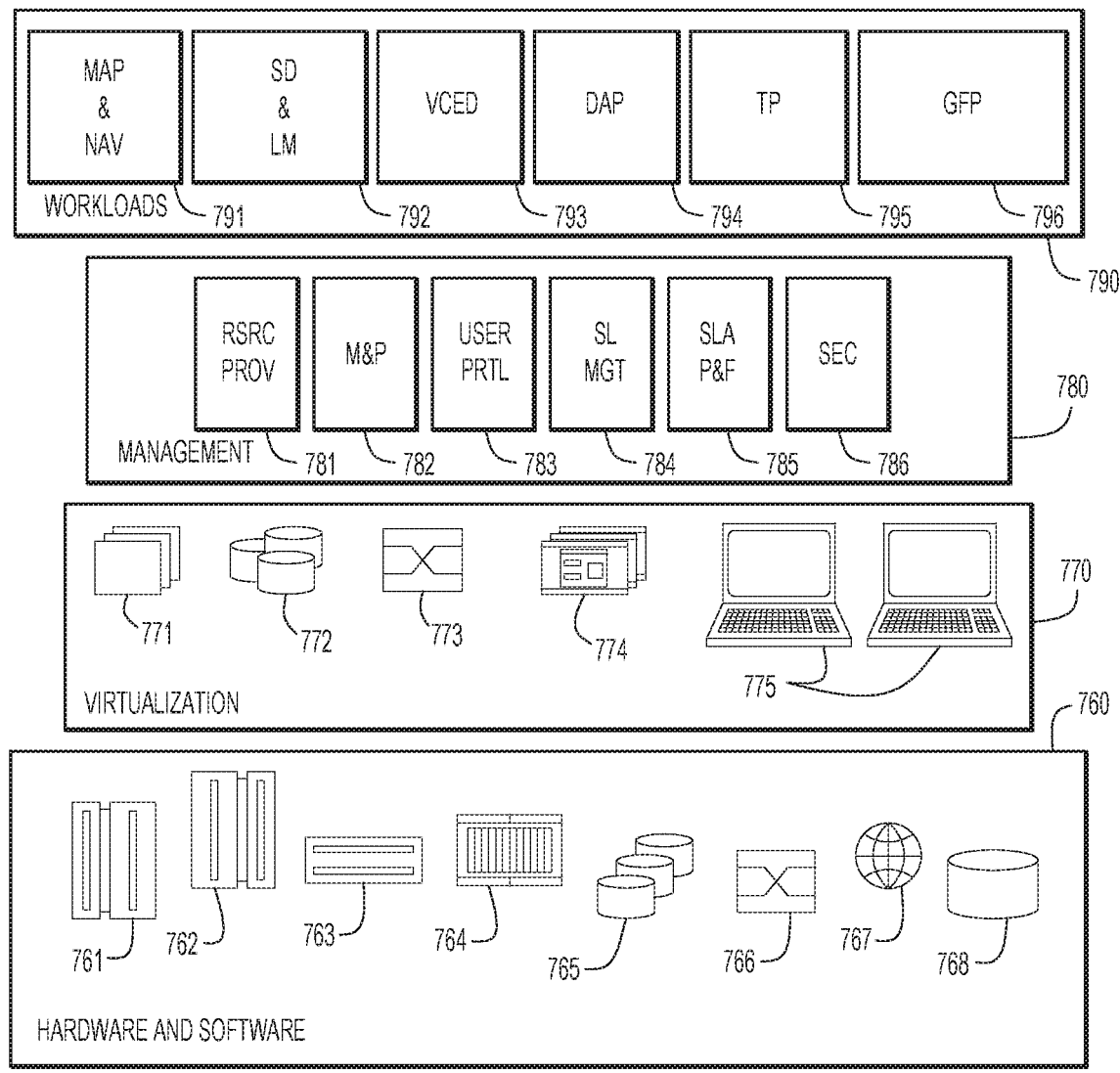
FIG. 7 illustrates a set of example functional abstraction layers that may be provided by a cloud computing environment according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA. Security (SEC) 786 provides identity verification for cloud consumers and tasks, as well as protection for data and other resources.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and gap filler processing (GFP) 796 for identifying ambiguities and missing information in natural language textual input and obtaining additional information for resolving ambiguities and filling the gaps in the missing information.

Figure 8:
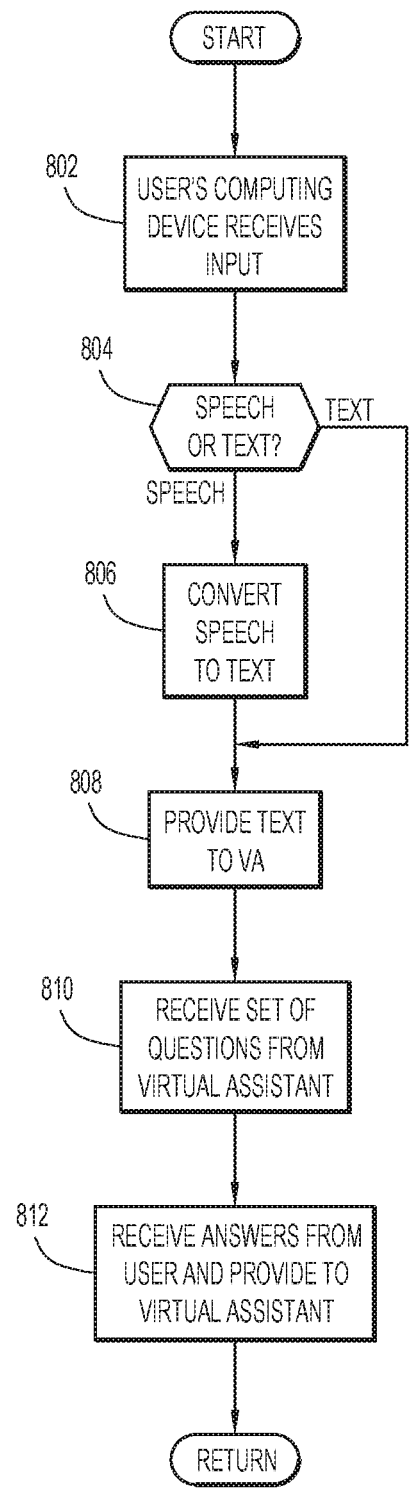
FIG. 8 is a flowchart of an example process that may be performed for providing input from a client computing device to a server computing device, and receiving and answering questions from the server computing device according to an embodiment of the present invention.

FIG. 8 is an example flowchart of a process that may be performed by user's computing device 104 in various embodiments. The process may begin with user's computing device 104 receiving natural language input from a user (act 802). The natural language input may be provided via microphone 346, a keyboard or via another means. User's computing device 104 then may determine whether the natural language input is provided via speech or text (act 804). If the natural language input is provided via speech, user's computing device 104 may convert the speech to natural language text (act 806).

After converting the natural language speech to natural language text, or after determining that the natural language input is provided via text, the text may be provided to VA 434, which may provide the text to natural language processing engine 502 where the text may be parsed and a meaning of the text determined and returned to VA 434. User's computing device 104 then may receive a set of questions from VA 434 (act 810) designed to derive a situational context. User's computing device 104 then may receive answers from the user via text or speech and may provide the answers to VA 434 as text (act 812).

Figure 9:
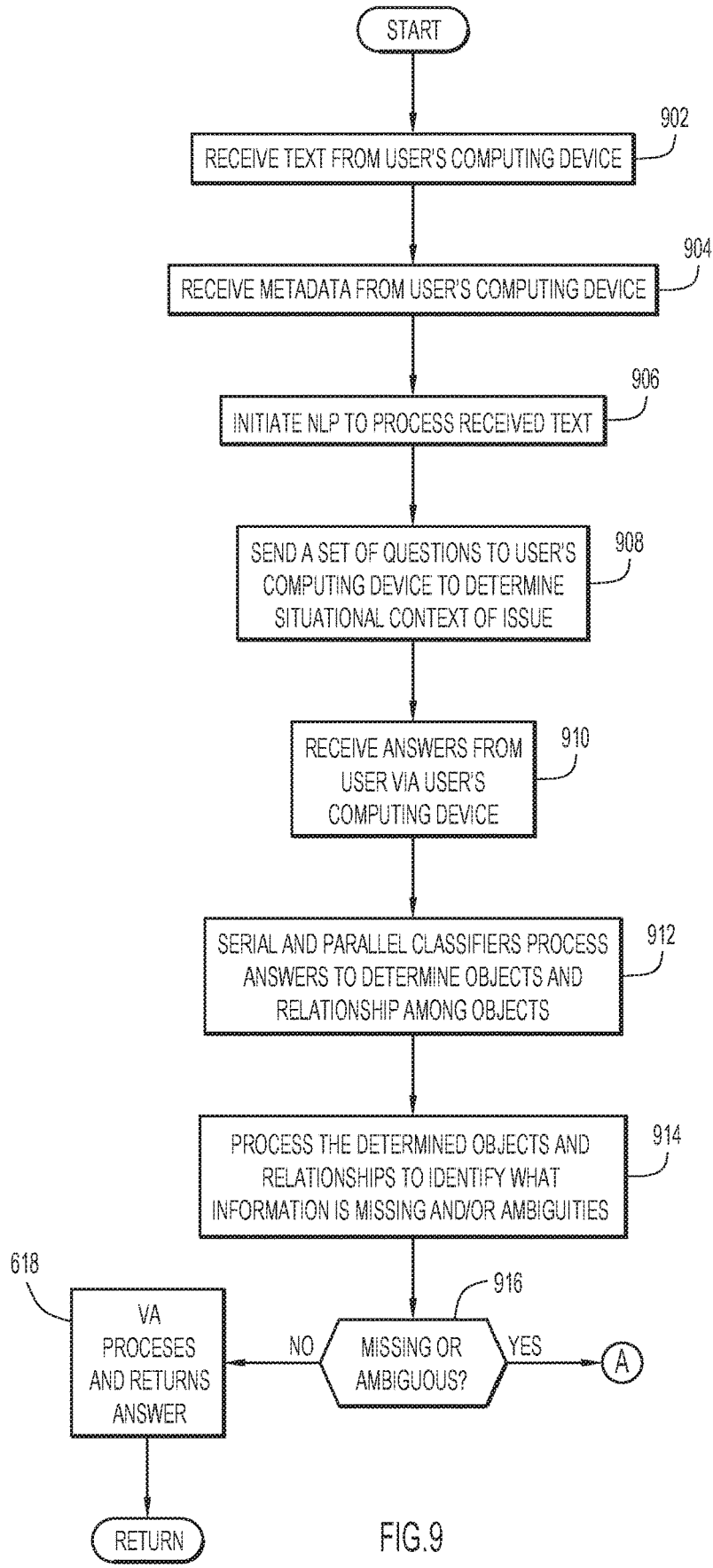
FIGS. 9 and 10 illustrate a flowchart of an example process performed by a server computing device to resolve ambiguities and fill in missing information in received input from a client computing device according to an embodiment of the present invention.

FIG. 9 illustrates example processing that may be performed by support center system 106 in various embodiments. The process may begin with VA 434 receiving natural language textual input from user's computing device 104 (act 902). Self exploration and evidence collector 432 of support center system 106 may receive metadata from user's computing device 104 (act 904), sent via API interconnect 422 of user's computing device 104 and received via information collection APIs 516 of self exploration and evidence collector 432. The metadata may include, but not be limited to, information relating to a location of user's computing device 104, personality details of the user, number of requests made over time, and user activity information.

VA 434 then may initiate natural language processing engine 502 to process the received text (906). Serial and parallel classifier 504 may parse the received text to determine object components within the received text and relationships among the object components. Further, the received text may be processed through a conventional natural language processing pipeline to annotate the text for determining a meaning of the text. The annotated text then may be provided to VA 434, which may formulate and provide questions to users computing device 104 for presentation to the user with an intent to determine a situational context regarding an issue related to the user's natural language input (act 908). VA 434 may receive the user's answers as text via user's computing device 104 and may provide the answers to natural language processing engine 502 to help determine the situational context (act 910). Serial and parallel classifiers 504 may process the answers to determine object components within the text and relationships among the object components (912). The determined object components and the relationships among the object components may be provided to vague data detector 508 to identify what information is missing and/or ambiguities within the received text based on the determined object components and relationships (act 914). In some embodiments, vague data detector may apply the determined object components and the relationships to a trained machine learning model to identify the missing information and/or the ambiguities.

If no missing information and no ambiguities are identified by vague data detector 508, then virtual assistant 434 may process the received answers and may provide an answer to an original request included in the received natural language input (act 918).

Figure 10:
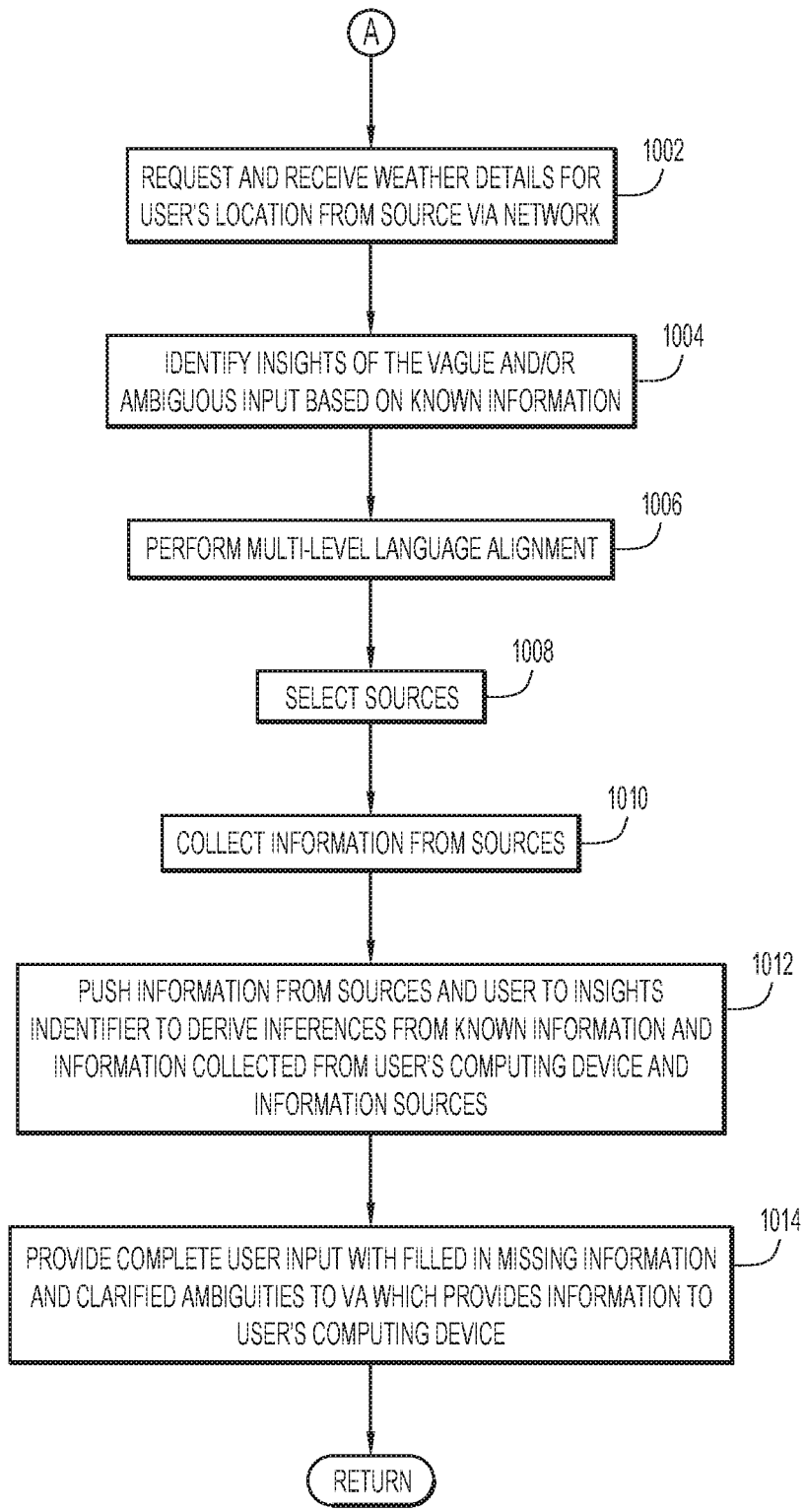

However, if, during act 916, vague data detector 508 identifies missing information or an ambiguity in the received text, then channel selector 520 may select an information source 108 for weather information for the location of the user's computing device 104 such that weather information may be collected via network 102 (act 1002 of FIG. 10). Insights identifier 506 may derive inferences and identify insights based on known information (act 1004). Multilevel language alignment, which may include but not be limited to repetition removal, semantic analysis and meaning identification of a sentence, may be performed to align regional language preferences for the user based on natural language input provided by the user (act 1006). Channel selector 520 may then select information sources 108 based on the missing information and the ambiguities identified by vague data detector 508 (act 1008). Channel monitor and API interface 526 may collect information from selected information sources 108 and may request and receive information from user's computing device 104 via VA to resource trigger 522 (act 1010).

In some embodiments, VA to resource trigger 522 may transmit a command to API interconnect 422, of user's computing device 104, to obtain an image, a video, or an audio. API interconnect 422 may communicate with device integrator 410, which may further communicate with any one or more of image capturing device 350 to capture an image or video, and a microphone to capture audio.

Received information from user's computing device 104 may be analyzed and information extracted therefrom and pushed, along with the information collected from information sources 108, to insights identifier 506 to derive inferences (act 1012). Based on the derived inferences, gap filler 528 may fill in the missing information and clarify any ambiguities to VA 434, which may provide requested information to user's computing device 104 for presentation to the user (act 1014). The presentation may be in a form of text on a display or as speech via a speaker.

The following is a brief example regarding triggering of an interface to user's computing device 104 to collect information. A user speaks into a microphone connected to user's computing device 104 and says "Her room is a mess."

User's computing device 104 may convert the spoken input to textual input and may provide the textual input to VA 434, which further provides the textual input to natural language processing engine 502. Natural language processing engine 502 parses the provided textual input and identifies object components and relationships among the object components and determines that there is no information regarding a mess in a room. VA to resource trigger 522 may be triggered to communicate with API interconnect 422 of user's computing device 104 to request an image or a video. API interconnect 422 may communicate with device integrator 410, which further communicates with image capturing device 350 to capture the image or the video of her room. The image or video may be provided to information collection APIs 516 via API interconnect 422. Information collection APIs 516 may further provide the image or the video to media frame extractor 524 for analysis and extraction of information, which may further be provided to insights updater and metadata map 528 for mapping the extracted information to metadata. The metadata may be provided to gap filler 514 for filling in gaps and resolving ambiguities in the provided textual input, which may further be provided to VA 434.

The following example illustrates collection of additional information from an information source via a network in order to provide missing information. The user speaks into microphone 346 of user's computing device 104 and says "The weather is awesome today." The speech input may be converted to textual input and provided to VA 434 via an API. VA 434 may provide the textual input to serial and parallel classifier 504 to parse the textual input to identify object components and relationships among the object components. Vague data detector 508 may identify what information is missing. Channel selector 520 may be invoked to collect information from at least one information source 108 regarding today's weather at a location of the user's computing device 104. Channel monitor and API interface 526 may collect information from the at least one information source 108 and media frame extractor 524 may extract today's weather information from the collected information and may provide the weather information to insights updater and metadata mapper 528 and gap filler 514. Gap filler 514 fills in the missing information and provides complete textual input to VA 434.

It will be appreciated that the embodiments described above and illustrated in the drawings represent only a few of the many ways of implementing embodiments for filling gaps in missing information and resolving ambiguities.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical media, magneto-optic media, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for providing missing information and resolving ambiguities related to textual input virtual assistant applications as well as other applications.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for filling gaps in information provided to a first computing system, the computer-implemented method comprising:
   receiving, by the first computing system, first textual input in natural language from a second computing system;
   performing, by the first computing system, natural language processing of the received first textual input, the natural language processing identifying vagueness and missing information in the first textual input;
   formulating, by the first computing system, questions to determine a situational context of the first textual input;
   providing, by the first computing system, the questions to the second computing system and receiving answers to the questions;
   performing, by the first computing system, natural language processing of the answers and identifying vagueness and missing information in the answers that are related to the vagueness and missing information in the first textual input;
   obtaining, by the first computing system, additional information from at least one source responsive to identifying the vagueness and the missing information in the first textual input and the answers, wherein the obtaining the additional information further comprises:
    requesting the second computing system to use a local device of the second computing system to capture and return the additional information including one of an image, a video, and audio;
resolving the identified vagueness and the missing information in the first textual input and the answers based on the obtained additional information and determining a meaning of the first textual input, wherein the resolving further comprises:
    performing, by the first computing system, multilevel language alignment to align regional language preferences for a user for different geographic regions using a same natural language based on natural language input provided by the user, wherein the multilevel language alignment includes repetition removal, semantic analysis, and meaning identification of a sentence; and
    generating at least some missing information based on a determined region of the user and the aligned regional language preferences; and
providing, by the first computing system to the second computing system, output based on the determined meaning for presentation to the user.

2. The computer-implemented method of claim 1, further comprising:
    collecting and considering, by the first computing system, information regarding a location of the second computing system, weather for the location, and user personality insights, the first textual input being based on input provided by the user via the second computing system; and
    selecting one or more sources of the at least one source from which to obtain the additional information based on the collected information and at least one of the identified vagueness and the missing information in at least one of the first textual input and the answers.

3. The computer-implemented method of claim 2, further comprising:
    updating, by the first computing system, a library regarding data mining preferences for the user and linguistic preferences for the user for future natural language processing of natural language input originating from the user.

4. The computer-implemented method of claim 2, wherein the selecting the one or more sources of the at least one source from which to obtain the additional information further comprises:
    selecting the one or more of the at least one source based on the identified vagueness in the first textual input; and
    obtaining the additional information from the selected one or more sources of the at least one source via a network.

5. The computer-implemented method of claim 1, wherein software is provided as a service in a cloud computing environment.

6. A computing system for filling gaps in provided input, the computing system comprising:
    at least one processor connected to a network; and
    at least one memory connected to the at least one processor, the at least one processor being configured to:
        receive first textual input in natural language from a second computing system;
        perform natural language processing of the received first textual input, the natural language processing identifying vagueness and missing information in the first textual input;
        formulate questions to determine a situational context of the first textual input;
        provide the questions to the second computing system and receive answers to the questions;
        perform natural language processing of the answers and identify vagueness and missing information in the answers that are related to the vagueness and missing information in the first textual input;
        obtain additional information from at least one source responsive to identifying the vagueness and the missing information in the first textual input and the answers, wherein the obtaining the additional information further comprises:
            requesting the second computing system to use a local device of the second computing system to capture and return the additional information including one of an image, a video, and audio;
        resolve the identified vagueness and the missing information in the first textual input and the answers based on the obtained additional information and determine a meaning of the first textual input, wherein the resolving further comprises:
            performing multilevel language alignment to align regional language preferences for a user for different geographic regions using a same natural language based on natural language input provided by the user, wherein the multilevel language alignment includes repetition removal, semantic analysis, and meaning identification of a sentence; and
            generating at least some missing information based on a determined region of the user and the aligned regional language preferences; and
        provide, to the second computing system, output based on the determined meaning for presentation to the user.

7. The computing system of claim 6, wherein the at least one processor is further configured to:
    collect and consider information regarding a location of the second computing system, weather for the location, and user personality insights, the first textual input being based on input provided by the user via the second computing system; and
    select one or more sources of the at least one source from which to obtain the additional information based on the collected information, the identified vagueness and the missing information in the first textual input and the answers.

8. The computing system of claim 7, wherein the at least one processor is further configured to:
    update a library regarding data mining preferences for the user and linguistic preferences for the user for future natural language processing of natural language input originating from the user.

9. The computing system of claim 7, wherein the selecting the one or more sources of the at least one source from which to obtain the additional information further comprises the at least one processor being configured to:
    select the one or more of the at least one source based on the identified vagueness in the first textual input; and
    obtaining the additional information from the selected one or more sources of the at least one source via a network.

10. The computing system of claim 6, wherein the at least one processor is further configured to request and receive at least part of the additional information from the second computing system via inbound and outbound application program interfaces.

11. A computer program product for filling gaps in provided information, the computer program product comprising one or more computer readable storage media having program instructions collectively stored on the one or more computer readable storage media, the program instructions executable by a computer to cause the computer to:
- receive first textual input in natural language from a second computing system;
- perform natural language processing of the received first textual input, the natural language processing identifying vagueness and missing information in the first textual input;
- formulate questions to determine a situational context of the first textual input provide the questions to the second computing system and receive answers to the questions;
- perform natural language processing of the answers and identify vagueness and missing information in the answers that are related to the vagueness and missing information in the first textual input;
- obtain additional information from at least one source responsive to identifying the vagueness and the missing information in the first textual input and the answers, wherein the obtaining the additional information further comprises:
  - requesting the second computing system to use a local device of the second computing system to capture and return the additional information including one of an image, a video, and audio;
- resolve the identified vagueness and the missing information in the first textual input and the answers based on the obtained additional information and determine a meaning of the first textual input, wherein the resolving further comprises:
  - performing multilevel language alignment to align regional language preferences for a user for different geographic regions using a same natural language based on natural language input provided by the user, wherein the multilevel language alignment includes repetition removal, semantic analysis, and meaning identification of a sentence; and
  - generating at least some missing information based on a determined region of the user and the aligned regional language preferences; and
- provide, to the second computing system, output based on the determined meaning for presentation to the user.

12. The computer program product of claim 11, wherein the program instructions are further executable by the computer to cause the computer to:
- collect and consider information regarding a location of the second computing system, weather for the location, and user personality insights, the first textual input being based on input provided by the user via the second computing system; and
- select one or more sources of the at least one source from which to obtain the additional information based on the collected information, the identified vagueness and the missing information in the first textual input and the answers.

13. The computer program product of claim 12, wherein the program instructions are further executable by the computer to cause the computer to:
- select the one or more of the at least one source based on the identified vagueness in the first textual input; and
- obtain the additional information from the one or more sources of the at least one source via a network.

14. The computer program product of claim 11, wherein the program instructions are further executable by the computer to cause the computer to:
- request and receive at least part of the additional information from the second computing system via inbound and outbound application program interfaces.

* * * * *